(12) United States Patent
Kuznetsov (10) Patent No.: US 11,808,946 B2
(45) Date of Patent: Nov. 7, 2023

(54) DIAPHRAGM FOR PERFORMING IMAGE POSITION CORRECTION OF A VIRTUAL IMAGE PROJECTABLE ON A WINDSHIELD OF A VEHICLE BY MEANS OF A HEAD-UP DISPLAY

(71) Applicant: AUDI AG, Ingolstadt (DE)

(72) Inventor: Alexandr Kuznetsov, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 107 days.

(21) Appl. No.: 17/683,581

(22) Filed: Mar. 1, 2022

(65) Prior Publication Data
US 2022/0365357 A1 Nov. 17, 2022

(30) Foreign Application Priority Data

Apr. 28, 2021 (DE) .......................... 102021110880.2

(51) Int. Cl.
*G02B 27/01* (2006.01)
*G06T 7/73* (2017.01)
(Continued)

(52) U.S. Cl.
CPC .......... *G02B 27/0179* (2013.01); *B60K 35/00* (2013.01); *G02B 5/005* (2013.01);
(Continued)

(58) Field of Classification Search
CPC .... G02B 27/0179; G02B 27/62; G02B 27/01; G02B 27/32; G02B 5/005;
(Continued)

(56) References Cited

U.S. PATENT DOCUMENTS 10,996,481 B1 * 5/2021 Wells ..................... B60K 35/00
11,482,141 B1 * 10/2022 Wells ................. G02B 27/0093
(Continued)

FOREIGN PATENT DOCUMENTS

DE 102005037797 A1 2/2007
DE 102010013224 A1 3/2011
(Continued)

OTHER PUBLICATIONS

Translation of DE102017100676 with annotated paragraph numbers (Year: 2023).*
(Continued)

*Primary Examiner* — Christopher E Leiby
(74) *Attorney, Agent, or Firm* — Maier & Maier, PLLC (57) ABSTRACT

A diaphragm for performing image position correction of a virtual image projectable onto a windshield of a vehicle by a head-up display. A first positioning mark, a second positioning mark, and a calibration mark are attached to a disk of the diaphragm. The disk is transparent at least in the region of the first positioning mark, the second positioning mark, and the calibration mark, so that a first image including the first positioning mark and a first positioning pattern recorded directly through the disk and output on the vehicle side, a second image including the second positioning mark and a second positioning pattern output on the vehicle side, mirrored by a mirror of the diaphragm and recorded through the disk.

20 Claims, 6 Drawing Sheets

(51) Int. Cl.
  *B60K 35/00* (2006.01)
  *G02B 5/00* (2006.01)
  *H04N 23/695* (2023.01)
(52) U.S. Cl.
  CPC ............. *G06T 7/73* (2017.01); *H04N 23/695* (2023.01); *B60K 2370/1529* (2019.05); *B60K 2370/21* (2019.05); *B60K 2370/777* (2019.05); *B60K 2370/92* (2019.05); *G06T 2207/30204* (2013.01); *G06T 2207/30244* (2013.01); *G06T 2207/30268* (2013.01)
(58) Field of Classification Search
  CPC ...... G02B 2027/0138; G02B 2027/014; G02B 2027/0159; G02B 2027/0198; G02B 2027/0192; B60K 35/00; B60K 2370/1529; B60K 2370/21; B60K 2370/777; B60K 2370/92; B60K 37/02; G06T 7/73; G06T 2207/30204; G06T 2207/30244; G06T 2207/30268; H04N 23/695; B60J 3/02; B60R 1/04; G01M 11/00
  See application file for complete search history.

(56) References Cited

U.S. PATENT DOCUMENTS

2019/0369398 A1\* 12/2019 Chen .................. G02B 27/0172
2021/0157135 A1\*  5/2021 Wells .................... G06T 7/0002

FOREIGN PATENT DOCUMENTS

| DE | 102014224302 A1 |   | 6/2015  |              |
|----|-----------------|---|---------|--------------|
| DE | 102015008887 A1 |   | 3/2016  |              |
| DE | 102017100676 A1 | * | 7/2018  | ......... G02B 27/0101 |
| DE | 102017100676 A1 |   | 7/2018  |              |
| DE | 102019206059 B3 |   | 3/2020  |              |
| DE | 102020005844 A1 |   | 11/2020 |              |

OTHER PUBLICATIONS

Search Report dated Dec. 15, 2021, in connection with corresponding German Application No. 102021110880.2 (10 pp., including machine-generated English translation).

\* cited by examiner

DIAPHRAGM FOR PERFORMING IMAGE POSITION CORRECTION OF A VIRTUAL IMAGE PROJECTABLE ON A WINDSHIELD OF A VEHICLE BY MEANS OF A HEAD-UP DISPLAY

FIELD

The present invention relates to a diaphragm for performing image position correction of a virtual image that can be projected onto a windshield of a vehicle by means of a head-up display. In addition, the invention relates to a respective calibration arrangement and a respective method.

BACKGROUND

So-called head-up displays are being used more and more frequently in modern vehicles. Head-up displays are used to project information onto the windshield of a vehicle and thus into the driver's field of vision. This gives the driver the feeling that the projected images become part of the vehicle environment visible through the windshield or blend into it, creating what is known as augmented reality. In addition to the projection of static information, i.e., information that is always in the same position on the windshield, information that changes position can also be displayed on the windshield. Examples in this context could be navigation arrows or bars positioned on the road to indicate a safety distance to be maintained, the highlighting of traffic signs, and the marking of potential sources of danger such as pedestrians or the like. Such a head-up display is known from DE 10 2010 013 224 A1.

In the context of the augmented reality that can be generated by means of the head-up display, it is of exorbitant importance that the projection image is projected to the correct location on the windshield. Otherwise, it could happen that, from the driver's point of view, danger spots or the like marked by means of the head-up display do not match the respective location in the vehicle's environment. It is therefore necessary to correct or calibrate the image position before the head-up display or the associated vehicle is put into operation or after an accident or the like.

To carry out image position correction or image position calibration, a diaphragm with an aperture or peephole is often first attached to sun visor holders of a motor vehicle so that it can swivel. In addition, an adjustment carriage with a calibration panel is positioned in front of the motor vehicle at a fixed relative position with respect to the vehicle. A test image is then projected onto the windshield of the motor vehicle using the head-up display, which corresponds to a calibration pattern shown on the calibration panel. A calibrator now looks at the calibration panel through the aperture of the diaphragm and detects any positional deviation between the calibration panel's calibration pattern and the projected test image. By appropriately changing a calibration parameter relating to the head-up display, calibration is then performed by changing the position of the test image on the windshield so that it is superimposed on the calibration pattern of the calibration panel. The diaphragm with the aperture ensures the correct observation position of the calibrator during the calibration process, which substantially corresponds to the expected viewing position of the driver. The inaccuracy due to the swiveling of the diaphragm has only a negligible influence on the calibration, since the calibration panel used is outside the vehicle and the optical path lengths involved are therefore large enough that changes in the swiveling of the diaphragm have no significant influence. Calibration is successfully completed when there is no longer any offset between the projected test image and the pattern displayed on the calibration panel.

A respective calibration concept is known, for example, from DE 10 2015 008 887 A1, where, instead of using a diaphragm, it is envisaged that a measuring unit is brought to a presumed driver's head position by means of a robotic arm, wherein the measuring unit captures an image of the image projected by means of the head-up display and the calibration panel. Here, the position of the measuring unit is captured by a camera using a marker attached to the measuring unit.

Another concept for correcting a head-up display is known from DE 10 2014 224 302 A1. In this concept, a vehicle is moved by means of a frame, wherein a vision camera attached to a robotic arm captures data projected onto the windshield. The images captured in this way are used to correct the images generated by the head-up display.

A disadvantageous circumstance concerning the known calibration concepts is that they are extremely costly and cumbersome with respect to their required technical means, such as separate calibration panels provided outside the motor vehicle, which have to be brought into an exactly predetermined relative position with respect to the motor vehicle, or the like.

SUMMARY

It is the object of the present invention to provide a simplified concept for carrying out image position correction of a head-up display.

According to the invention, this object is achieved in a diaphragm of the aforementioned type in that a first positioning mark, a second positioning mark, and a calibration mark are attached to a disk of the diaphragm, wherein the disk is transparent at least in the region of the first positioning mark, the second positioning mark, and the calibration mark, so that a first image including the first positioning mark and a first positioning pattern recorded directly through the disk and output on the vehicle side, a second image including the second positioning mark and a second positioning pattern output on the vehicle side, mirrored by a mirror of the disk, and recorded through the disk, and a calibration image including the calibration mark and a calibration pattern projected onto the windshield by means of the head-up display and recorded directly through the disk, can be captured.

The invention is based on the idea that several aspects required in connection with calibration, such as the provision of a calibration pattern and means for correct positioning of the components involved, are implemented by means of the diaphragm. This eliminates the need for other components that would otherwise be required, such as separate calibration panels that must be positioned outside the motor vehicle.

Thus, the diaphragm is adapted to allow a calibration image to be captured which shows the calibration mark of the diaphragm and the image of the head-up display projected onto the windshield. In this case, the image projected onto the windshield is recorded through the disk of the diaphragm. In other words, the disk is in the field of view of the calibration image in such a way that, if the disk were not transparent at this point, the projected image would be covered by the disk. The calibration is ultimately performed by using a positional deviation or offset between the calibration pattern and the calibration mark on the calibration image to determine a correction value, wherein the calibration is performed by setting or adjusting a calibration parameter relating to the head-up display by the correction value. The calibration mark is not, as in the prior art, provided by an adjustment carriage with calibration table to be arranged externally, but by the mark accordingly applied to the diaphragm.

For correct determination of the correction value, it is necessary that the diaphragm is in a fixed and defined diaphragm end position with respect to the motor vehicle when the calibration image is recorded, and that the calibration image is recorded from the viewpoint of a capturing end position that is also fixed and defined with respect to the motor vehicle. Thus, the information to be acquired by means of the calibration image, from which the correction value is determined, depends on the respective diaphragm and capturing positions, wherein, in contrast to the prior art, the correct diaphragm position also plays an important role, since the optical path lengths involved are significantly shorter than in the prior art.

Thus, the first positioning mark and the second positioning mark of the diaphragm are provided for correct positioning of the diaphragm and the capturing position. The diaphragm and an image capturing means, such as a camera or a human eye, are in their respective correct positions when the calibration image is captured, if the first positioning mark and the first positioning pattern are superimposed on the first image and the second positioning mark and the second positioning pattern are superimposed on the second image. Thus, the first positioning mark and the second positioning mark are arranged on the disk of the shutter in such a way that, provided that the first and second positioning patterns are arranged at a correspondingly stationary and known position in the motor vehicle, the corresponding overlay is present exclusively when both the shutter and the image capture means are in their respective correct positions. This circumstance allows the required diaphragm and capturing end positions to be determined and adopted relatively easily and without great effort by means of the first and second images.

Regarding the first image, the first positioning pattern, as well as the calibration pattern during the calibration process, is recorded directly through the transparent disk. However, the first image alone would not be sufficient to determine the positions of the diaphragm and the observer or camera required to capture the calibration image. Thus, due to the indeterminacy of this system, there are multiple positions that the diaphragm and the image capturing means can take, so that the first positioning pattern and the first positioning mark are superimposed on the first image.

For the final determination of the capturing as well as the diaphragm end position, the second image is captured, wherein in this context it is essential that the second positioning pattern captured through the disk is not captured directly but mirrored by the mirror of the diaphragm. In other words, the second image does not show the second positioning pattern directly, but instead shows a corresponding mirror image of the second positioning pattern. By causing the second positioning pattern to be recorded via the mirror rather than directly when the second image is captured, the optical path with respect to the second positioning pattern is caused to lengthen accordingly, whereby the capturing position and the diaphragm position can be determined with sufficient accuracy. In addition, by taking two images into account, it is possible to unambiguously determine the capturing end position as well as the diaphragm end position, which would not be the case using only one image.

With regard to the specific design of the diaphragm, it should be noted that it is typically arranged inside the motor vehicle when image position correction is carried out and therefore has dimensions suitable for this purpose. In particular, the disk of the diaphragm is substantially rectangular in shape, such as having rounded corners to avoid sharp edges that could injure a calibrator or scratch the interior components of the vehicle. The disk can be flat. Alternatively, the disk may have the shape of a curved surface, and the corresponding shape may be adapted to the likewise curved shape of the windshield of the vehicle.

To enable the first and second positioning patterns and the calibration pattern to be recorded through the disk, the disk is transparent in the respective areas, i.e., in the areas of the respective associated marks. Likewise, the entire disk can be transparent. Transparent means in this context that light, especially light in the optical wavelength range, which is used to capture the first and second images as well as the calibration image, passes through the disk, preferably completely, without interference.

In a preferred embodiment, the diaphragm can be movably mounted in the vehicle. This eliminates the need to hold the diaphragm in position in a comparatively cumbersome way, such as by means of a robot arm that is guided into the vehicle from the outside through a side window. In this case, it is particularly preferable for the diaphragm to be pivotably fastened in the vehicle. For example, swiveling holders are technically relatively easy to implement, for example by means of a vehicle sun visor holder. For example, the visor may have fastening means adapted to the sun visor holder, such as a hooking eye, if the sun visor holder is a hook holder.

Since two sun visor holders are often provided in vehicles, namely on the driver's side and the passenger's side, the visor preferably has two corresponding fastening means. In particular, the diaphragm can be swiveled about a single axis that is parallel to the horizontal transverse axis of the vehicle. This causes the diaphragm to have only one degree of freedom of movement in the fixed state, which ultimately facilitates the determination or adjustment of the diaphragm position.

In the diaphragm according to the invention, it is particularly preferred that the mirror is arranged or can be arranged on the side of the disk. Although there is a great deal of design freedom with respect to the position of the mirror on the disk, the respective lateral arrangement causes a particularly large extension of the optical path with respect to the second positioning pattern on the second image. Since a correct relative position between the mirror and the second positioning mark is of utmost importance for an exact calibration, the mirror is particularly preferably fixedly arranged on the disk so that this relative position could not even be changed in the event of shocks or the like. In this context, for example, a connection by means of an adhesive or a screw connection or the like may be provided.

In particular, the mirror is angled, approximately at a 90° angle, to that of the disk. The mirror is arranged either in front of or behind the disk with respect to the capturing position. In the first case, the light representing the second positioning pattern first passes through the disk and is then reflected at the mirror, whereas in the second case this is exactly the other way around.

With regard to the mirror, a left mirror may be arranged or arrangeable on the left side of the disk and a right mirror on the right side of the disk. If a mirror is arranged on both sides of the disk, the diaphragm, which is particularly symmetrical, can be used for left-hand and right-hand drive vehicles. Accordingly, the first positioning mark, the second positioning mark, and the calibration mark may each be arranged twice, that is, symmetrically, on the disk.

The disk can be made of a transparent plastic, in particular an acrylic glass, at least in the areas of the first positioning mark, the second positioning mark, and the calibration mark. Thus, a respective transparent plastic typically has advantageous properties with respect to the lowest possible weight of the disk, its mechanical properties, in particular with respect to breakage and shatter resistance, and with respect to its transparency properties. Particularly preferably, the disk is made entirely of the transparent plastic.

Preferably, the first positioning mark and/or the second positioning mark and/or the calibration mark is or comprises at least one line and/or at least one cross and/or at least one, in particular square, rectangle and/or at least one circle. It is conceivable that the respective marks or patterns comprise a combination of several respective geometric shapes and contours, which simplifies the detection of the offset on the respective images. For example, the rectangle or square to implement the respective marks or the respective pattern can form a diamond or checkerboard shape.

With respect to the provided patterns and marks, successful calibration requires that an overlay or offset be determined in the captured images. It is therefore essential that a mark-pattern pair provided in each case is designed in such a way that a respective overlay or offset can be determined in principle. This is the case, for example, when the mark and the pattern are identical in terms of their geometric shape. In general, however, it is sufficient if the respective molds are at least appropriately matched to each other for determining the offset. For example, the mark may be a circle with a diameter and the associated pattern may be a circular ring whose inner diameter is basically the same as the diameter of the circle of the mark. As for the second positioning marker and the second positioning pattern, it should be noted here that the shapes must be mirror-image matched to each other, since the second image contains the mirror image of the second positioning pattern. Thus, an axisymmetric geometric shape may be provided with respect to the second positioning pattern and the second positioning mark.

The marks may be provided, for example, in the form of a sticker affixed to the disk. Alternatively, the marks can be printed, embossed, in particular hot embossed, stamped or lasered onto or into the disk, in particular onto or into the acrylic glass.

The invention further relates to a calibration arrangement for performing image position correction of a virtual image that can be projected onto a windshield of a vehicle by means of a head-up display. According to the invention, the calibration arrangement comprises
  a diaphragm according to the preceding description,
  a first display device on the vehicle side for outputting the first positioning pattern,
  a second display device on the vehicle side for outputting the second positioning pattern, and
  the in-vehicle head-up display.

All features, advantages and aspects explained in connection with the diaphragm according to the invention can be equally applied to the calibration arrangement according to the invention and vice versa.

Thus, as explained above, in order to perform the image position correction, it is necessary that the first and the second positioning patterns are output at a known and fixed position with respect to the motor vehicle, which is ensured by the two display devices. These can be either fixed or detachably fastened at predefined and defined positions in the motor vehicle.

As for the head-up display on the vehicle, this display may comprise an imaging unit for generating the projection and an optical module, in particular with a collimator, for influencing, in particular deflecting, the projection light generated by means of the imaging unit. The respective influencing can be done by means of a system of mirrors and/or lenses of the optical module. The imaging unit emits the projection light in the direction of a projection surface, in this case in the direction of the windshield of the vehicle.

The windshield is a reflective and translucent window, allowing the driver to perceive the real world behind the window in addition to the mirrored information from the head-up display. The imaging unit, i.e., the projector, and the optical module are arranged behind the dashboard of the vehicle from the driver's point of view, wherein the projection light is emitted upwards towards the windshield.

The actual implementation of image position correction or calibration relates in particular to the optical module and the deflection of the projection image caused by the optical module. Consequently, the calibration parameter relating to the head-up display that is set for image position correction can be the degree or amount of a deflection of the projection light with respect to a certain direction, such as the optical axis of the imaging unit, which in the installed state of the head-up display can correspond to a vehicle vertical axis, for example. Thus, two calibration parameters can be set in this context. A first calibration parameter may relate to the degree or amount of deflection of the projection light with respect to the tilt about a transverse axis of the vehicle. The first calibration parameter thus relates to a shift of the projected image on the windshield with respect to an up-down direction. A second calibration parameter may relate to the degree or amount of deflection of the projection light with respect to the tilt about a longitudinal axis of the vehicle. The second calibration parameter thus relates to a shift of the projected image on the windshield with respect to a left-right direction.

The first display device may be a first display arranged on the driver's side of a dashboard of the vehicle and/or the second display device may be a second display arranged centrally on the or a dashboard or a center console of the vehicle. The first and/or second display device can thus be used not only exclusively in the context of performing image position correction, but also for other purposes in the context of everyday use of the vehicle. For example, the first display device or the first display can be a speedometer display. The second display device may be part of an infotainment system of the vehicle.

The calibration arrangement may comprise a camera by means of which the first image and/or the second image and/or the calibration image can be captured. Similarly, in the context of the present invention, it is conceivable for the calibrator to sit in a driver's seat of the vehicle to capture the images and to perform the capturing of the images and the associated evaluation and calibration himself.

If a camera is provided, it can be arranged on a positioning device, in particular on a robot arm guided from the outside through a side window of the vehicle, wherein the position of the camera can be changed by means of the positioning device. Transfer of the camera to the respective positions, such as the capturing end position, can therefore be automated by means of the electromechanical actuators of the positioning device and thus, in particular in comparison to the calibrator carrying out the capturing of the respective images himself, with a higher precision and accuracy.

The calibration arrangement according to the invention may comprise at least one control device which is set up for evaluating the first image and/or the second image and/or the calibration image, and/or for generating control signals for controlling the or a positioning device and/or for generating control signals for carrying out the image position correction, in particular for controlling the optical module of the head-up display. Thus, the evaluation of the images can preferably be carried out using software by which the offset or the positional deviations between the respective pattern and the mark on the images can be determined. Details concerning such software programs are sufficiently known to a person skilled in the art and are therefore not explained in detail within the scope of this description.

Depending on the positional deviations or variables determined therefrom, control signals can be generated by means of the control device, which signals cause a change in the position of the camera by means of the positioning device and, if necessary, the diaphragm, as well as the setting of the calibration parameter. Capture of the variables can be determined, for example, by means of at least one lookup table stored in the control device or calculated by means of at least one predefined analytical correlation.

The invention further relates to a method for performing image position correction of a virtual image projectable onto a window of a vehicle by means of a head-up display, wherein the method comprising the following calibration preparation steps:
 a) arranging a diaphragm according to the above description in a preliminary diaphragm position in the vehicle,
 b) capturing the first image from the view of at least one preliminary capturing position,
 c) capturing the second image from the view of the preliminary capturing position,
 d) determining a first offset information that depends on any positional deviation between the first positioning pattern and the first positioning mark on the first image,
 e) determining a second offset information that depends on any positional deviation between the second positioning pattern and the second positioning marker on the second image,
 f) determining a capturing position deviation describing a deviation between the preliminary capturing position and a capturing end position, and a diaphragm position deviation describing a deviation between the preliminary diaphragm position and a diaphragm end position, based on the first offset information and/or the second offset information, and
 g) changing the preliminary capturing position towards the capturing end position or another preliminary capturing position and the preliminary diaphragm position towards the diaphragm end position or another preliminary diaphragm position depending on the capturing position deviation and/or the diaphragm position deviation,
 wherein the following steps are performed for image position correction:
 h) capturing the calibration image from the view of the capturing end position while the diaphragm is located in the diaphragm end position,
 i) determining calibration offset information that depends on any positional deviation between the calibration pattern and the calibration mark on the calibration image,
 j) determining at least one correction value based on the calibration offset information, wherein the correction value describes a parameter adjustment required to perform the image position correction, wherein the correction value is determinable based on the fact that the calibration image was captured from the view of the capturing end position and in this case the diaphragm was arranged in the diaphragm end position, and
 k) performing the image position correction by changing at least one calibration parameter relating to the head-up display by the correction value.

All features, advantages and aspects explained in connection with the method according to the invention are equally applicable to the diaphragm according to the invention as well as to the calibration arrangement according to the invention, and vice versa.

As has already been mentioned several times, it is indispensable for carrying out the image position correction that, in addition to the first display device and the second display device, the diaphragm and the image capture means, such as a camera or the eyes of the calibrator, are also arranged in the predetermined and firmly defined end positions, since otherwise it would not be possible to determine the correction value from the positional deviation between the calibration pattern and the calibration mark on the calibration image and thus to carry out the image position correction. Thus, the process steps to be performed as part of the calibration preparation steps serve the purpose of determining and adopting the required diaphragm end position and capturing end position.

Thus, step a) provides that the sun visor according to the invention is arranged in the vehicle in the preliminary visor position according to the above description, in particular by suspending the sun visor in the sun visor holders of the vehicle, so that the sun visor can ultimately be swiveled about a horizontal axis defined by the sun visor holders and is thus movable with respect to one degree of freedom. The preliminary diaphragm position can be any position with respect to the swiveling of the diaphragm. As for the preliminary capturing position to be adopted in steps b) and c), which is for example a head or eye position of the calibrator or a camera position, there are three degrees of freedom, namely with respect to the three spatial directions. As for these preliminary positions, they should be selected in such a way that the preliminary capturing position is approximately the expected eye position of the driver of the vehicle, and that the second positioning pattern is actually recognizable in the mirror in the second image. The capture of the images in steps b) and c) can take place, for example, as part of the manual perception of these images by the calibrator or also as part of the image capturing and storage carried out by the camera.

As for steps d) and e), an evaluation of the first image and the second image is performed to the effect that a measure or degree of the positional differences of the positioning mark and the positioning pattern on the respective image plane is detected, that is, the offset information. These may each include any horizontal positional deviation and any vertical positional deviation between the respective positioning pattern and the associated positioning mark on the corresponding image.

Ultimately, the offset information is captured with the aim of determining information regarding a deviation between the current, i.e., preliminary, capturing and diaphragm positions and the respective end positions. The determination of this information, that is, the capturing position deviation and the diaphragm position deviation, is then performed in step f) of the method. As has been explained, appropriate lookup tables or predefined analytical contexts can be used for this purpose.

In step g) of the method, the capturing position and the swivel position of the diaphragm are then corrected, namely as a function of the capturing position deviation and diaphragm position deviation just determined.

As for steps a) to f) of the procedure, these can be carried out in succession according to their alphabetical order. Alternatively, step d), i.e., the determination of the first offset information, can be carried out immediately after step b), i.e., the capture of the first image, wherein steps f) and g), i.e., a first adjustment of the respective positions is carried out thereafter. This ultimately corresponds to an initial rough positioning with respect to the diaphragm position and the capturing position. Following this, step c), i.e., capture of the second image, and step e), i.e., the determination of the second offset information, can be carried out, after which steps f) and g) can be run through again, so that this part ultimately corresponds to a fine adjustment of the respective positions. Alternatively, the capture of the second image, if necessary, with subsequent determination of the second offset information, can also take place before the capture of the first image. In other words, steps c), e), f) and g) can be carried out in connection with the second image as part of the first rough positioning, wherein steps b), d), f), and g) are carried out thereafter in connection with the first image for fine positioning.

Regardless of the specific sequence with respect to steps a) to g), it is necessary in any case that the capturing end position and the diaphragm end position have been adopted during the last run-through of step g), and that this has been done with as high an accuracy as possible. As soon as this is the case, the actual image position correction starts under steps h) to k).

After the calibration image has been captured in step h) of the method, that is, for example, by the calibrator himself or by the camera, the calibration offset information is determined in step i), that is, analogously to the determination of the first and second offset information in the course of calibration preparation. Thus, the calibration offset information regarding a horizontal deviation and a vertical deviation between the calibration pattern and the calibration mark on the calibration image can be captured.

The calibration offset information is then used in step j) to determine information, namely the correction value, regarding the adjustment of the calibration parameter required for image position correction. This can again be done using appropriate lookup tables or specified analytical relationships.

The actual calibration, i.e., the specific change of the calibration parameter by the correction value, finally takes place in the last step k) of the method, with the end of which the method and the execution of the calibration is basically completed.

As for calibration preparation, i.e., steps a) to g), a calibration condition can be checked after step g) of the method, wherein the method is continued in step h) if the calibration condition is met and is restarted at step a) if the condition is not met. The calibration condition is met if the capturing position deviation and the diaphragm position deviation captured are smaller than a specified limit value. So, in other words, the calibration condition check performed after step g) causes steps a) through g) to be repeated, if necessary, until the current capturing end position and diaphragm end position are sufficiently close to the required capturing end position and diaphragm end position. The tolerance for this is greater, the greater the specified limit value.

In analogy to the verification of the calibration condition after step g), a termination condition can be verified after step k) of the method, wherein the method is terminated if the termination condition is met and is continued again in step h) if the condition is not met. In particular, the termination condition is met if the correction value determined in step j) is smaller than a respectively specified limit value. Here, too, the actual calibration process is run through repeatedly, if necessary, until the calibration pattern and the calibration mark on the calibration image have been specified with sufficient accuracy on the basis of the respectively specified limit value.

BRIEF DESCRIPTION OF THE FIGURES

Further details and advantages will be apparent from the exemplary embodiments described below and with reference to the drawings. Wherein, schematically.

DETAILED DESCRIPTION

Figure 1:
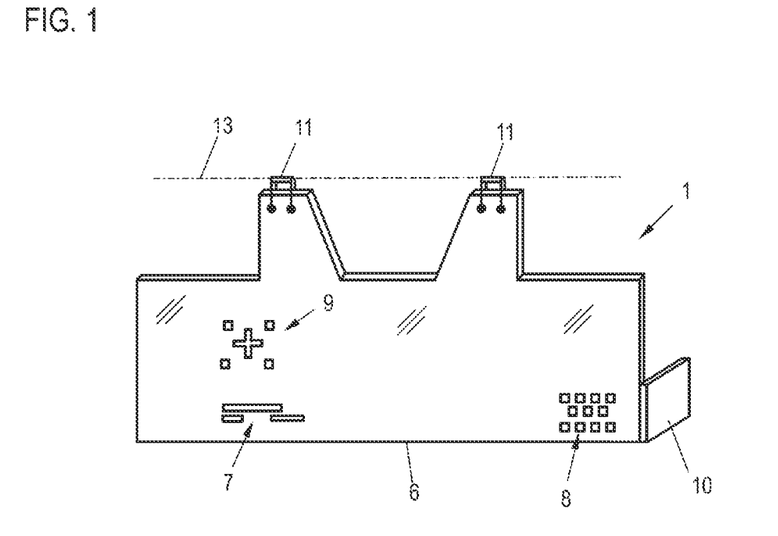
FIG. 1 shows an exemplary embodiment of a diaphragm according to the invention.
Figure 2:
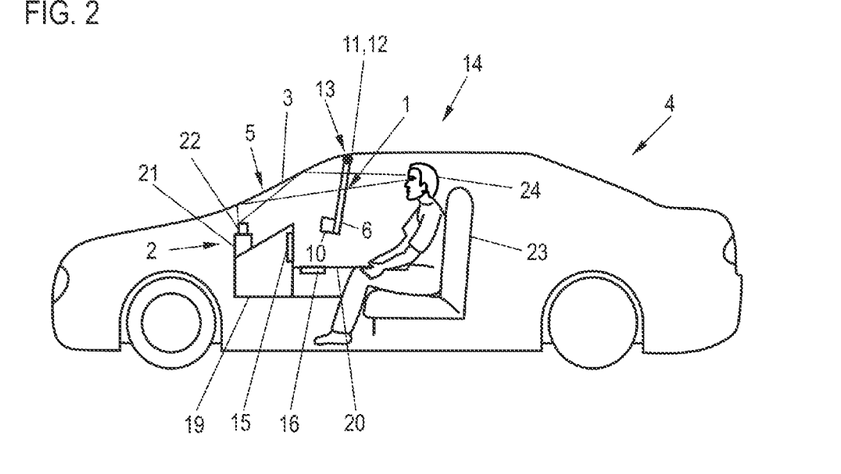
FIG. 2 shows a first embodiment of a calibration arrangement in a motor vehicle comprising the diaphragm of FIG. 1.
Figure 3:
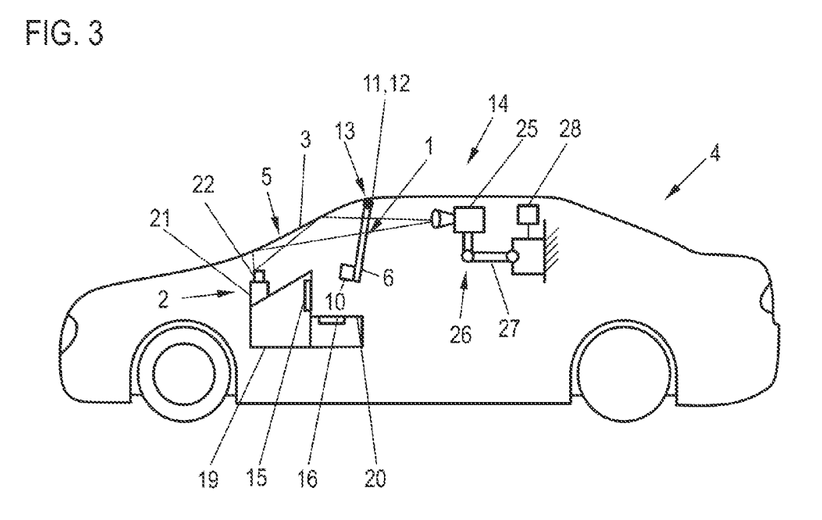
FIG. 3 shows a second embodiment of a calibration arrangement in a motor vehicle comprising the diaphragm of FIG. 1.
Figure 4:
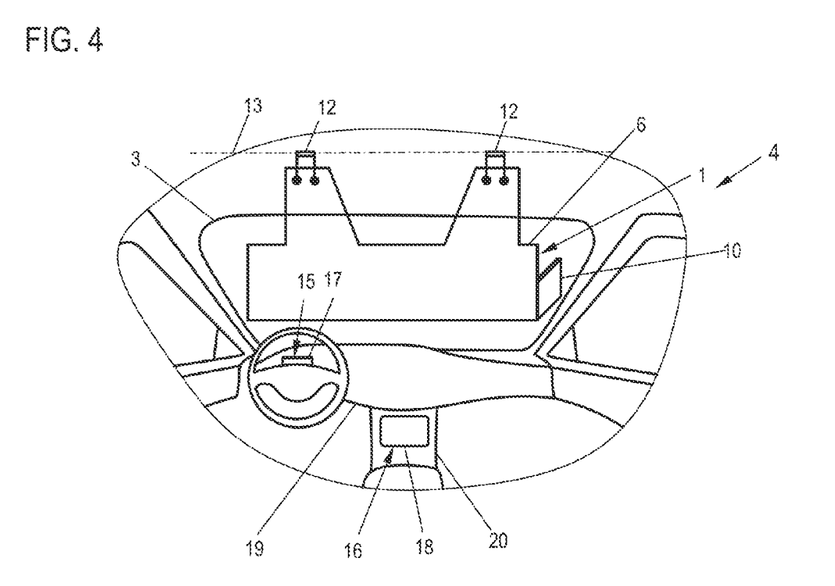
FIG. 4 shows a view of a portion of the calibration arrangement of FIG. 2 or 3 as seen from a vehicle interior.

FIG. 1 shows a diaphragm 1 according to the invention, by means of which an image position correction of a virtual image 5 that can be projected by a head-up display 2 onto a windshield 3 of a vehicle 4, such as a motor vehicle shown in FIGS. 2 and 3, can be carried out. The diaphragm 1 comprises a disk 6, exemplarily flat, which is made of a transparent plastic, namely an acrylic glass. A first positioning mark 7, a second positioning mark 8, and a calibration mark 9 are attached to the disk 6. Furthermore, the diaphragm 1 comprises a mirror 10 arranged on the side of the disk 6. The mirror 10 is glued to the rear of the disk 6, projecting at right angles from its edge. For fastening the diaphragm 1 in the vehicle 4, the diaphragm 1 has two fastening means 11 on its upper side in the form of suspension eyes, by means of which these eyes can each be fastened to a hook-like sun visor holder 12 of the vehicle 4. The diaphragm 1 can therefore be pivoted about a pivot axis 13 defined by the fastening means 11 or sun visor holder 12.

FIG. 1 shows that the diaphragm 1 or disk 6 has a symmetrical shape with respect to its vertical axis. The diaphragm 1 shown refers to a vehicle 4 designed as a left-hand drive vehicle. The marks 7, 8, 9 as well as the mirror 10 can additionally or alternatively be provided respectively mirror-inverted with respect to the axis of symmetry, so that the diaphragm 1 can also be used for a right-hand drive.

Details regarding marks 7, 8, 9 are explained below. These are exemplarily attached as one sticker each on the disk 6. Alternatively, these marks 7, 8, 9 can also be printed, embossed or lasered in.

The first positioning mark 7 comprises three lines arranged one above the other as well as side by side, as shown in FIG. 1. The second positioning mark 8 comprises a number of squares arranged in a checkered pattern relative to each other. Calibration mark 9 includes a cross and four squares evenly spaced around the cross. The specific design of the marks 7, 8, 9 is to be understood as merely exemplary. Other shapes, especially circles or the like, as well as arrangements of shapes are equally conceivable.

FIG. 2 shows a first embodiment of a calibration arrangement 14 according to the invention, comprising the diaphragm 1 as well as a first display device 15, a second display device 16, and the head-up display 2 of the vehicle 4. The first display device 15 is a first display 17 arranged on the driver's side on a dashboard 19 of the vehicle 4, which is used as a speedometer display or as a respective instrument cluster in everyday driving operation. The second display device 16 is a second display 18 arranged on a center console 20 of the vehicle 4 and used as part of an infotainment system of the motor vehicle 4 in everyday driving operation.

Details regarding the head-up display 2 arranged behind the dashboard 19 are explained below. Referring to FIG. 2, the head-up display 2 comprises an imaging unit configured as a projector 21 for creating a projection for generating the virtual image 5. The head-up display 2 further comprises an optical module 22, by means of which the projection generated by the projector 21 can be influenced or deflected with respect to its radiation direction. This is done by means of a system of mirrors and/or lenses of the optical module 22. To generate the virtual image 5, the projection is emitted upwards towards the windshield 3 by means of the projector 21. In this case, the projection is reflected on the windshield 3 in the direction of a driver of the motor vehicle 4, so that from this viewpoint the virtual image 5 on the windshield 3, on the one hand and the surroundings lying in front of the motor vehicle 4 on the other hand, can be recognized due to the transparency of the windshield 3.

To carry out the method according to the invention with respect to image position correction, a calibrator 24 sitting on a driver's seat 23 of the vehicle 4 is provided in the calibration arrangement 14 shown in FIG. 2. Details in this respect will be explained later in connection with the respective exemplary embodiment of the method according to the invention.

FIG. 3 shows a second exemplary embodiment of a calibration arrangement 14 according to the invention, which differs from the calibration arrangement 14 shown in FIG. 2 only with respect to aspects relating to the calibrator 24. For example, in the calibration arrangement 14 shown in FIG. 3, a camera 25 is provided instead of the calibrator 24. The camera 25 is supported by a positioning device 26, namely a robot arm 27 guided from the outside through a side window of the vehicle 4. The position of the camera 25 can be changed by means of the positioning device 26. Details regarding the respective position changes will be presented later in detail in connection with the respective exemplary embodiment of the method according to the invention. The positioning device 26 is controlled by control signals from a control device 28, which is present outside the vehicle 4 as part of a respective control and evaluation system, which is not shown in more detail here.

Figure 5:
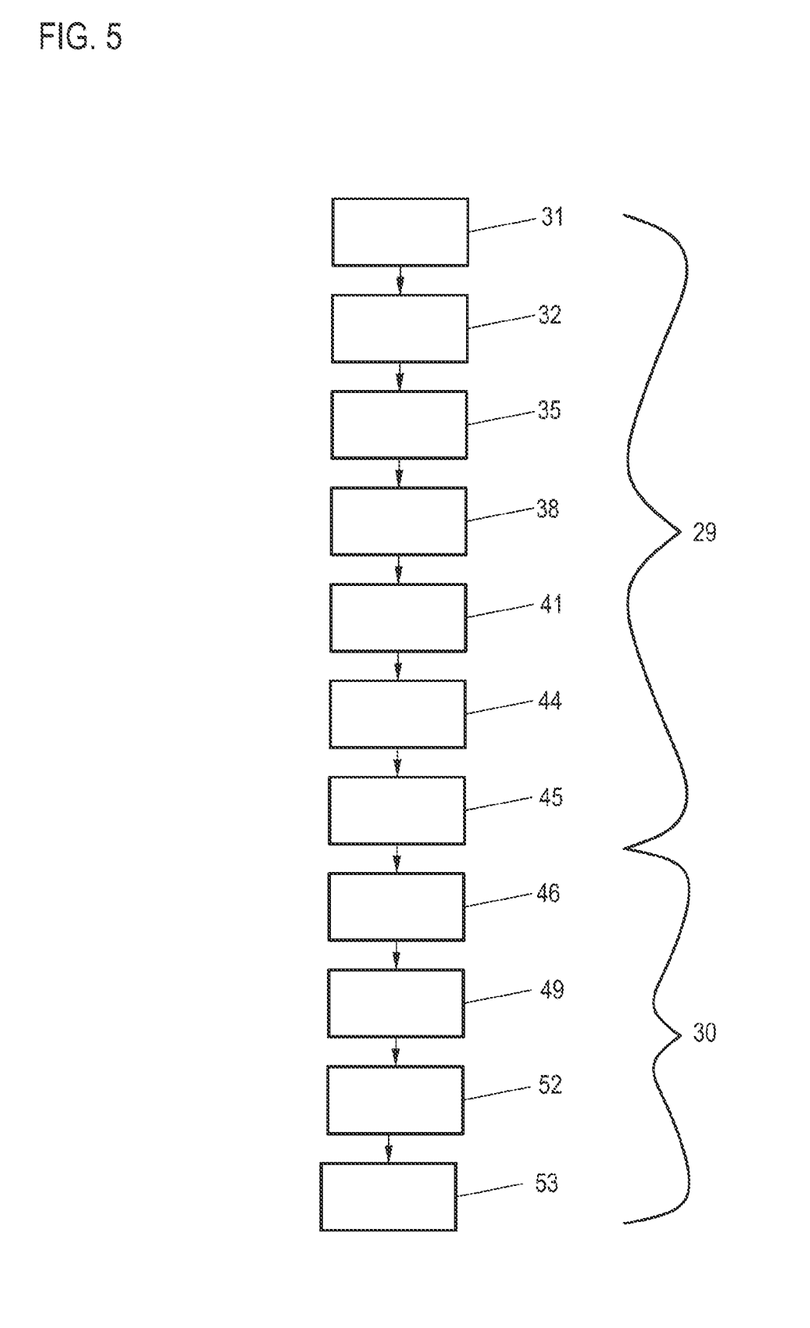
FIG. 5 shows an example of a first image.

To better illustrate the calibration arrangements 14 shown in FIGS. 2 and 3, each is shown in FIG. 5 as viewed from the interior of the vehicle 4 along the longitudinal direction of the vehicle to the front, but without the calibrator 24 or the camera 25.

With reference to FIG. 5, a first exemplar embodiment of a method according to the invention for carrying out the image position correction of the virtual image 5 that can be projected by means of the head-up display 2 onto the windshield 3 of the vehicle 4 is described below. Action of the calibrator 24 is required to carry out this exemplary embodiment, wherein this exemplary embodiment refers to the calibration arrangement shown in FIG. 2.

Basically, the method can be divided into two phases, i.e., a preparation phase 29 and a calibration phase 30. The purpose of the preparation phase 29 is to ensure that the diaphragm 1 and the eyes of the calibrator 24 are respectively brought into a diaphragm end position and capturing end position required to perform the actual calibration, which subsequently takes place during the calibration phase 30.

Thus, in a first step 31 of the method, the diaphragm is arranged in a preliminary diaphragm position in the vehicle 4. For this purpose, the diaphragm 1 is suspended in the sun visor holders 12 by means of the fastening means 11, wherein the diaphragm 1 can be pivoted about the pivot axis 13 which runs parallel to the transverse axis of the vehicle 4. The preliminary diaphragm position is any swivel position of the diaphragm 1.

Figure 6:
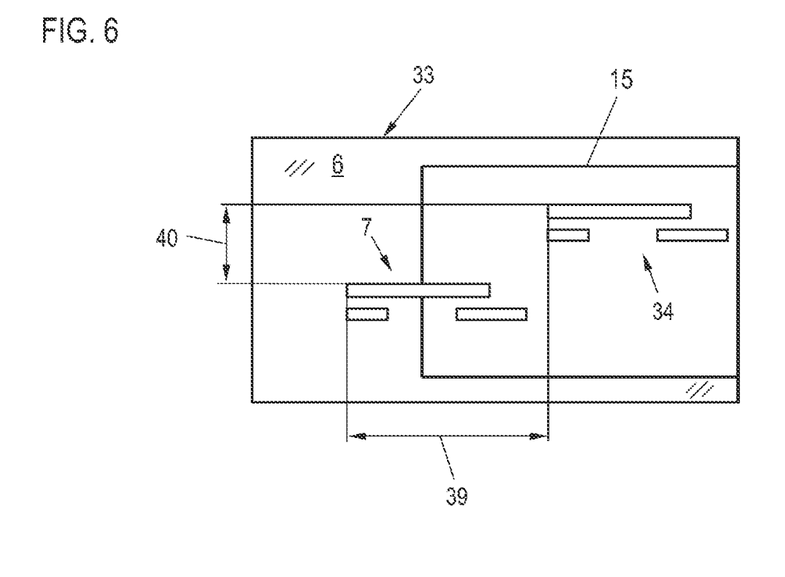
FIG. 6 shows an example of a second image.

In a second step of the method 32, a first image 33 is acquired from the view of a preliminary capturing position. The first image 33 is captured by the calibrator 24, who sits on the driver's seat 23 and whose head or eyes are arranged in the preliminary capturing position. The preliminary capturing position here is any possible head position of a driver of the vehicle 4. Capture of the first image 33 is performed in the direction of the first positioning mark 7. An example of what the first image 33 might look like is shown in FIG. 6. Thus, the first image 33 shows the first positioning mark 7 and a first positioning pattern 34 recorded directly through the disk 6 of the diaphragm 1. The first positioning pattern 34 corresponds to the first positioning mark 7 with respect to its shape.

After capturing the first image 33, capturing a second image 36 from the view of the preliminary capturing position is performed by the calibrator 24 as part of a next step 35. In this case, the second image 36 is captured in the direction of the second positioning mark 8, so that second image 36, exemplified in FIG. 7, includes the second positioning mark 8 and a second positioning pattern 37 output by means of the second display device 16. In contrast to the first positioning pattern 34, however, the second image 36 does not include the second positioning pattern 37 recorded directly through the disk 6, but the second positioning pattern 37 is here additionally mirrored by the mirror of the diaphragm 10. In other words, the second image 36 includes, in addition to the second positioning marker 8, the mirror 10 in which the second positioning pattern 37 of the second display device 16 is visible, wherein this mirror image is respectively captured through the disk 6. The geometric shape of the mirror symmetric second positioning pattern 37 corresponds to the second positioning mark 8.

In a next step 38 of the method, a first offset information is determined based on the first image 33. Here, the first offset information describes the degree or amount of any horizontal position deviation 39 and any vertical position deviation 40 between the first positioning pattern 34 and the first positioning mark 7 on the first image 33.

Similarly, in a next step 41 of the method, a second offset information is determined, namely concerning the degree and amount, respectively, of any horizontal positional deviation 42 and any vertical positional deviation 43 between the second positioning pattern 37 and the second positioning mark 8 on the second image 36.

In a next step 44 of the method, a capturing position deviation and a diaphragm position deviation are determined. The capturing position deviation describes a deviation between the preliminary, i.e., current, capturing position and the capturing end position to be determined. Similarly, the diaphragm position deviation describes the deviation between the preliminary, i.e., current, diaphragm position and the diaphragm end position to be determined.

These deviations are determined based on the first offset information and the second offset information, i.e. the deviation between patterns 34, 37 and marks 7, 8 on images 33, 36. Here, a greater deviation between the patterns 34, 37 and the marks 7, 8 means that there is a correspondingly greater deviation of the current capturing and/or diaphragm position from the capturing end and diaphragm end positions. Consequently, the calibrator 24 is exactly in the capturing end position and the diaphragm 1 is in the diaphragm end position when the respective positioning pattern 34, 37 overlaps with the associated mark 7, 8 of the disks 6 on the first image 33 and the second image 36.

In a next step 45 of the method, the calibrator 24 changes the preliminary capturing position to the capturing end position and the preliminary diaphragm position to the diaphragm end position.

Figuratively speaking, within the framework of the method steps just explained, which can ultimately be carried out simultaneously, the calibrator 24 attempts, with the aid of a continuous or iterative adjustment of the capturing position and the diaphragm position, to bring the positioning marks 7, 8 and the positioning patterns 34, 37 on the images 33, 36 to superimposition, and in the process finally arrives at the capturing end position and brings the diaphragm 1 into the diaphragm end position. In this respect, the calibrator 24 may also proceed in such a way as to use the second image 36 in the context of a rough positioning with respect to the preliminary diaphragm position and the preliminary capturing position, in that he searches for a preliminary position combination at which the second calibration pattern 37 appears in the mirror 10 in the second image 36. After this, he can use the first image 33 for fine positioning. All the method steps described so far relate to the preparation phase 29 mentioned at the beginning.

Since, with respect to the capturing position and the diaphragm position, there is only one possibility in which the position deviations on the images 33, 36 disappear or overlap both positioning marks 7, 8 with the respective associated positioning pattern 34, 37, that is, the capturing end position and the diaphragm end position, the method is continued in a next step 46, in which the calibration phase 30 begins, as soon as the respective end positions have been reached. In this step 46, the calibrator 24 captures a calibration image 47 that looks like the calibration image 47 shown in FIG. 8, for example. This capturing is done from the view of the capturing end position, with the diaphragm 1 in the diaphragm end position. The calibration image 47 shows the calibration mark 9 of the disk 6 and a calibration pattern 48 projected onto the windshield 3 by means of the head-up display 2 and recorded directly through the disk 6.

In a next step 49 of the method, the calibrator 24 determines calibration offset information relating to the degree or amount of positional deviation, if any, between the calibration pattern 48 and the calibration mark 9 on the calibration image 47. Specifically, a horizontal position deviation 50 and a vertical position deviation 51 between the calibration pattern 48 and the calibration mark 9 on the calibration image 47 are determined.

In a next step 52 of the method, a correction value is determined based on the calibration offset information, i.e., the position offsets 50, 51, which value describes a parameter adjustment required to perform the image position correction. In other words, a required degree or amount is determined from the positional deviations 50, 51 by which the projection generated by means of the head-up display must be deflected by the optical module 22 so that the virtual image 5 is displayed at the correct position on the windshield 3. It applies here as well that the change in a calibration parameter affecting the head-up display 2 required to perform the image position correction must be the greater, the greater the position deviations 50, 51 are.

In a final step 53 of the method, the image position correction is now performed by adjusting or changing the calibration parameter. Specifically, a first and a second calibration parameter can be adjusted accordingly, i.e. the amount or strength of the deflection of the projection by means of the optical module 22 with respect to a first direction perpendicular to the radiation direction of the projection on the one hand and the amount or strength of the deflection of the projection by means of the optical module 22 with respect to a second direction perpendicular to the radiation direction of the projection and to the first direction on the other hand. The first direction or the first calibration parameter corresponds to the horizontal position deviation 50, and the second direction or the second calibration parameter corresponds to the vertical position deviation 51. The respective adjustment of the calibration parameters is also performed by the calibrator 24, for example via one of the displays 17, 18.

The steps of the calibration phase 30 can also be performed quasi-simultaneously on the part of the calibrator 24, wherein the calibrator 24 continuously performs the adjustment of the calibration parameter relating to the head-up display 2, keeping track of the deviation between the calibration pattern 48 and the calibration mark 9 on the calibration image 47.

The method is ultimately completed once the calibration pattern 48 and the calibration mark 9 on the calibration image 47 match. It is important that during the complete calibration phase 30 both the diaphragm 1 remains in the diaphragm end position and the calibrator 24, or his eyes, respectively, stably remain in the capturing end position. To check this, the calibrator 24 should keep track not only of the calibration image 47, but also of the first image 33 and the second image 36 during the calibration phase 30.

Figure 7:
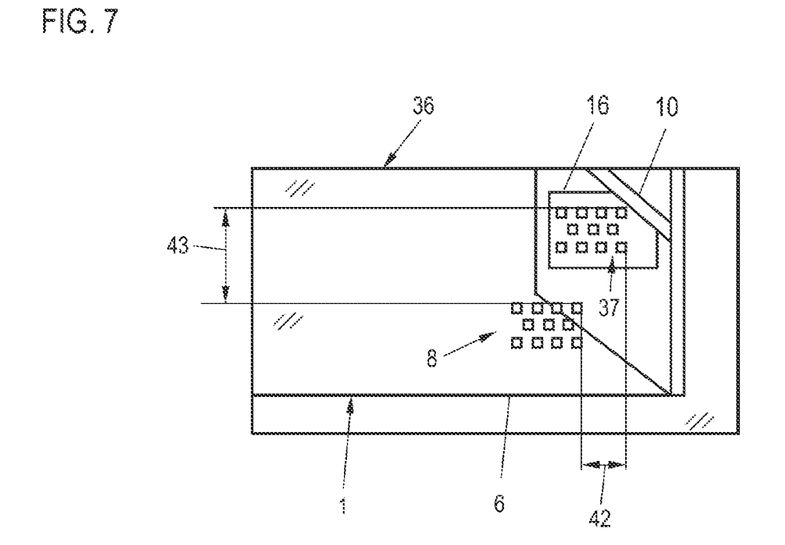
FIG. 7 shows an example of a calibration image.
Figure 8:
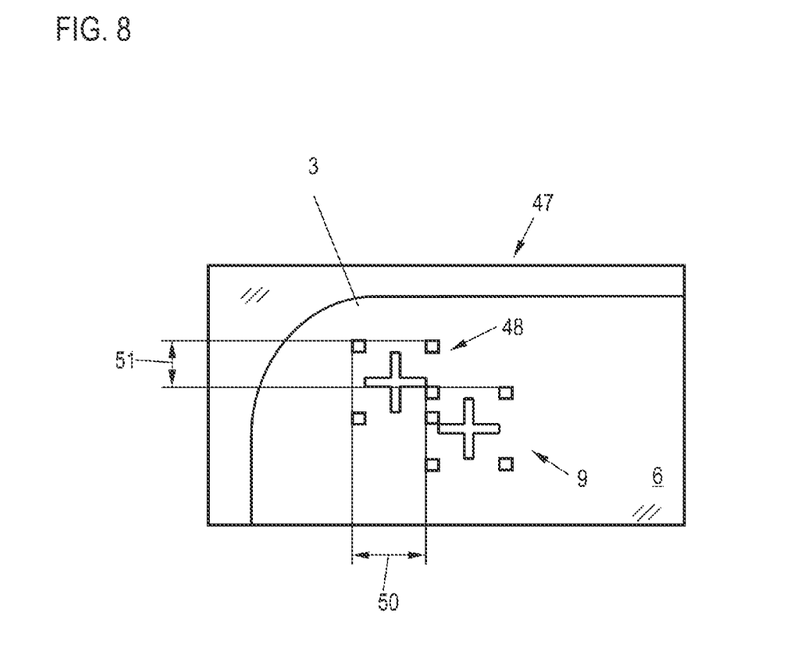
FIG. 8 shows a first exemplary embodiment of a method according to the invention related to the calibration arrangement of FIG. 2.

In general, it should be noted in connection with the method according to the invention that the marks 7, 8, 9 and patterns 34, 37, 48 shown in FIGS. 33, 36, 47 could be distorted in perspective due to the respective recording angles. This particularly affects the second image 36 since the line of sight created in connection with the second image 36 is obliquely incident on the mirror 10 as well as the second display device 16. The resulting perspective distortion must be taken into account, for example, in the output of the patterns 34, 37, 48 by the display devices 15, 16 and/or in the specific design of the marks 7, 8, 9, for example in the context of a respective pre-distortion on the part of the display devices 15, 16 or the marks 7, 8, 9. This effect is not considered in the context of the figures shown here for reasons of clarity and comprehensibility.

Figure 9:
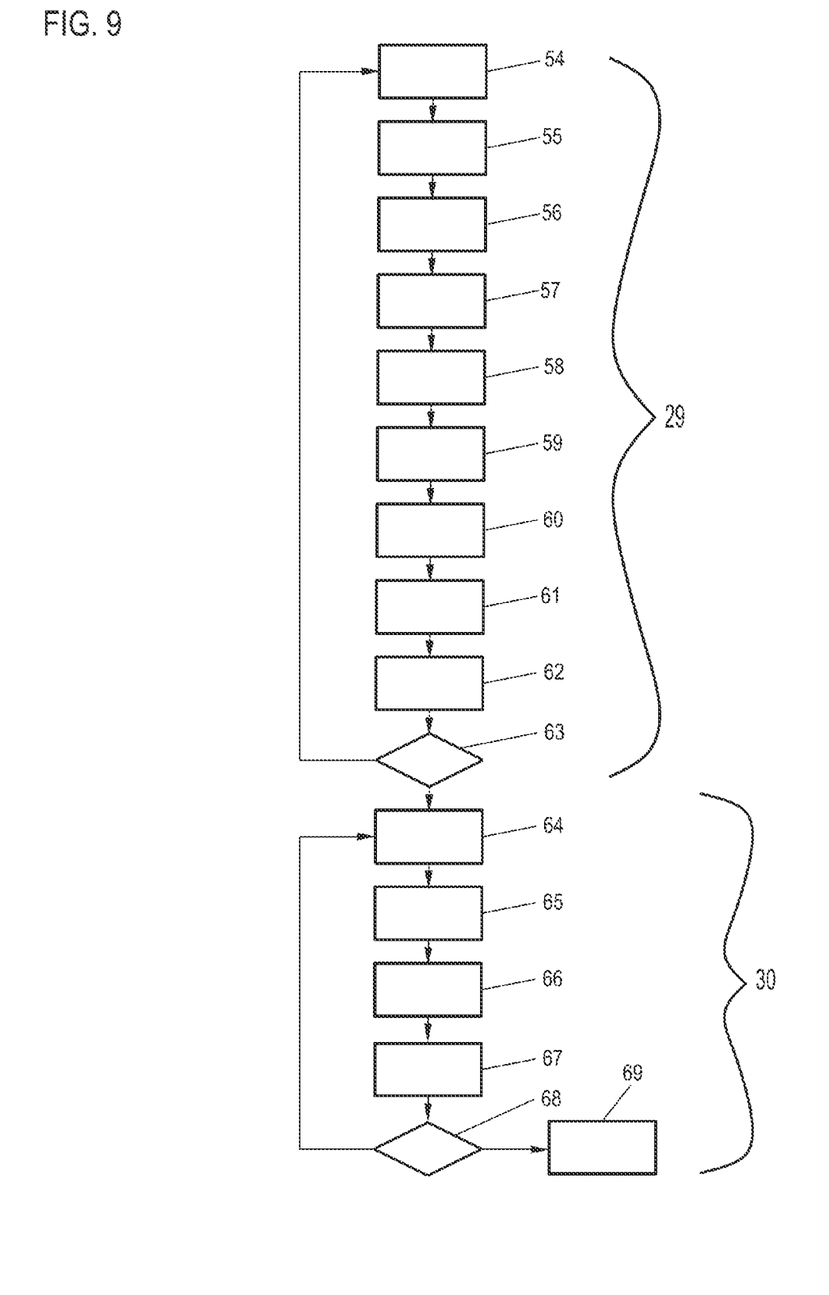
FIG. 9 shows a second exemplary embodiment of a method according to the invention related to the calibration arrangement of FIG. 3.

Below, FIG. 9 is used to explain a second exemplary embodiment of the method according to the invention, which can be conducted in connection with the calibration arrangement 14 shown in FIG. 3, in which the camera 25 is provided instead of the calibrator 24. Like the method explained with reference to FIG. 5, the second exemplary embodiment can be divided into a preparation phase 29 and a calibration phase 30.

In a first step 54 of this method, which corresponds to the first step 31 of the method explained in FIG. 5, the diaphragm 1 is arranged in the preliminary diaphragm position in the vehicle 4.

In a next step 55, the first image 33 is captured from the view of the preliminary capturing position. The capture of the first image 33 is performed by means of the camera 25, which is brought into the preliminary capturing position for this purpose by means of the positioning device 26. Again, the preliminary capturing position is not a fixed position of the camera 25 but is ultimately arbitrarily selectable within the range of an anticipated head position of a driver.

The selection of the preliminary diaphragm position and the preliminary capturing position within the scope of steps 54, 55 can in particular be carried out manually by the calibrator 24, who is not located in the vehicle 4 in this exemplary embodiment, for example by controlling the positioning device 26, so that at the beginning of this exemplary embodiment of the method, which can in principle be carried out automatically, the first and second images 33, 36 each contain all the information required for positioning, that is, the positioning marks 7, 8 and the positioning patterns 34, 37.

In a next step 56, the first offset information is determined based on the exemplary first image 33 shown in FIG. 6. For this purpose, the first image 33 is transmitted to the control device 28, which is set up to determine the horizontal position deviation 39 and the vertical position deviation 40 within the framework of respective image evaluation software.

From the first offset information comprising the position deviations 39, 40, a preliminary capturing position deviation and a preliminary diaphragm position deviation are determined in a next step 57 of the method. For this purpose, a respective lookup table or analytical relationship is stored in the control device 28, which makes it possible to determine the resulting preliminary capturing and diaphragm position deviation from the values of the horizontal position deviation 39 and the vertical position deviation 40. However, these preliminary deviations do not yet necessarily affect the deviation between the current positions and the end positions, as was envisaged in the first exemplary embodiment, since so far only the first image 33 has been recorded and evaluated, which alone is not yet sufficient for final determination of the end positions. Instead, the preliminary capturing and diaphragm position deviation relates to a required position change of the diaphragm 1 and the camera 25, so that, on the first image, the horizontal position deviation 39 and the vertical position deviation 40 between the first positioning mark 7 and the first positioning pattern 34 become zero, and in this case there is only an approximation to the respective end positions.

In a next step 58, the control device 28 generates a control signal for controlling the positioning device 26 so that the preliminary capturing position of the camera 25 is changed by the preliminary capturing position deviation toward another preliminary capturing position, and in this case an approach to the final capturing position is made.

In addition, as part of step 58, information regarding the preliminary diaphragm position deviation is output to the calibrator 24, for example via a monitor or the like, on the basis of which the diaphragm 1 is manually transferred to another preliminary diaphragm position. For this purpose, another electromechanical actuator which can be controlled by means of the control device 28 can likewise be provided in the area of the fastening means 11 or sun visor holders 12. Changing the preliminary diaphragm position to the other preliminary diaphragm position also causes the respective end position to be approached.

In a next step 59, the second image 36 is captured from the view of the other preliminary capturing position while the diaphragm 1 is arranged in the other preliminary diaphragm position. This capture is also conducted by means of the camera 25.

Using the exemplary second image 36 shown in FIG. 7, which is also transmitted to the control device 28, the next step 60 is to determine the second offset information comprising the possible horizontal position deviation 42 and the possible vertical position deviation 43 between the second positioning pattern 37 and the second positioning mark 8 on the second image 36. This is equally done via the image evaluation software provided on the part of the control device 28.

In a next step 61, the second offset information is evaluated analogously to the evaluation of the first offset information of step 57, and in a subsequent step 62, analogously to step 58, the diaphragm and capturing positions are changed again, ideally but not necessarily to the capturing and diaphragm end positions.

In a next step 63, a calibration condition is checked, and the preparation phase 29 is run through again if the condition is not met, and the calibration phase 30 is started if the condition is met. Specifically, in the context of this verification, if the capturing position deviation and the diaphragm position deviation determined in the context of the preceding steps 57 and 61 are smaller than a respective predetermined limit value, the calibration condition is met, and the method continues in a next step 64. In other words, meeting the calibration condition means that the marks 7, 8 and the respective associated patterns 34, 37 are already superimposed on the images 33, 36 within an inaccuracy defined by the predetermined limit value. If this superposition is not present, i.e., the capturing position deviation or the diaphragm position deviation is greater than the specified limit value, the procedure is restarted in step 54 and the preparation phase for determining and adopting the positions required for calibration is run through again. The preparation phase 29 is therefore repeated until the calibration condition is met and the required end positions have been assumed.

Provided that the calibration condition is met, the procedure continues in step 64, as mentioned above. The calibration image is captured by the camera 25, which is now in the respective end position, as is the diaphragm 1.

In a next step 65, the control device 28 determines the calibration offset information, which includes the horizontal positional deviation 50 shown in FIG. 8 and a vertical positional deviation 51 between the calibration pattern 48 and the calibration mark 9 on the calibration image 47.

Based on the calibration offset information, the correction value is determined in a next step 66, similarly based on, for example, a lookup table stored in the control device 28 or a predetermined analytical relationship between these variables.

In a next step 67 of the method, the image position correction is performed analogously to step 53 of the first embodiment, but with the difference that the respective control commands are not generated by the calibrator 24 but on the part of the control device 28.

Following this, a completion condition is checked in a step 68, wherein this condition is met if the correction value determined in step 66 is smaller than a respectively specified limit value. If the completion condition is met, the procedure is terminated in a final step 69 and the calibration is successfully completed. Unless the completion condition is met, the calibration phase 30, starting at step 64, is run again and the calibration is performed. In this case, the calibration phase 30 also iteratively runs through the respective calibration steps 64 to 68 until the value falls below the respectively specified limit value and the calibration is completed with sufficient accuracy, which is defined by the respective limit value.

It is also conceivable that the method according to the invention is composed within the framework of a combination of the embodiments explained with reference to FIGS. 5 and 9. For example, the capture of the images 33, 36, 47 may be performed by means of the camera 25, wherein the images are transmitted to respective output monitors or the like, and the position corrections and calibration steps are performed on the part of the calibrator 24.

The invention claimed is:

1. A diaphragm for performing image position correction of a virtual image projectable onto a windshield of a vehicle by a head-up display, comprising:
   a first positioning mark, a second positioning mark, and a calibration mark are attached to a disk of the diaphragm, wherein the disk is transparent at least in the region of the first positioning mark, the second positioning mark, and the calibration mark, wherein
       a first image including the first positioning mark and a first positioning pattern recorded directly through the disk and output on the vehicle side,
       a second image including the second positioning mark and a second positioning pattern output on the vehicle side, mirrored by a mirror of the diaphragm and recorded through the disk, and
       a calibration image including the calibration mark and a calibration pattern projected onto the windshield by means of the head-up display and recorded directly through the disk, can be captured.

2. The diaphragm according to claim 1, wherein it can be fastened movably, in particular pivotably, in the vehicle, preferably to a sun visor holder of the vehicle.

3. The diaphragm according to claim 1, wherein the mirror is or can be arranged laterally on the disk.

4. The diaphragm according to claim 3, a left-hand mirror is or can be arranged on the left-hand side of the disk and a right-hand mirror is or can be arranged on the right-hand side of the disk.

5. The diaphragm according to claim 1, wherein the disk, at least in the regions of the first positioning mark, the second positioning mark, and the calibration mark, consists of a transparent plastic, in particular of an acrylic glass.

6. The diaphragm according to claim 1, wherein the first positioning mark and/or the second positioning mark and/or the calibration mark is or comprises at least one line and/or at least one cross and/or at least one, in particular square, rectangle and/or at least one circle.

7. A calibration arrangement for performing an image position correction of a virtual image that can be projected onto a windshield of a vehicle by a head-up display, wherein the calibration arrangement comprises
   a diaphragm according to claim 1,
   a first display device on the vehicle side for outputting the first positioning pattern,
   a second display device on the vehicle side for outputting the second positioning pattern, and
   the in-vehicle head-up display.

8. The calibration arrangement according to claim 7, wherein the first display device is a first display which is arranged on the driver's side on a dashboard of the vehicle and can in particular also be used as a speedometer display, and/or the second display device is a second display which is arranged centrally on the or a dashboard or a center console of the vehicle.

9. The calibration arrangement according to claim 7, wherein it comprises a camera by which the first image and/or the second image and/or the calibration image can be captured.

10. The calibration arrangement according to claim 9, wherein the camera is arranged on a positioning device, in particular on a robot arm guided from the outside through a side window of the vehicle, wherein the position of the camera can be changed by means of the positioning device.

11. The calibration arrangement according to claim 9, wherein it comprises at least one control device which is set up for evaluating the first image and/or the second image and/or the calibration image and/or for generating control signals for controlling the or a positioning device and/or for generating control signals for carrying out the image position correction, in particular for controlling an optical module of the head-up display.

12. A method for performing an image position correction of a virtual image that can be projected onto a windshield of a vehicle by means of a head-up display, wherein the method comprises the following calibration preparation steps:
   a) arranging a diaphragm according to claim 1 in a preliminary diaphragm position in the vehicle,
   b) capturing the first image from the view of at least one preliminary capturing position,
   c) capturing the second image from the view of the preliminary capturing position,
   d) determining a first offset information that depends on any positional deviation between the first positioning pattern and the first positioning mark on the first image,
   e) determining a second offset information depending on any positional deviation between the second positioning pattern and the second positioning mark on the second image,
   f) determining a capturing position deviation describing a deviation between the preliminary capturing position and a capturing end position, and a diaphragm position deviation describing a deviation between the preliminary diaphragm position and a diaphragm end position, based on the first offset information and/or the second offset information, and
   g) changing the preliminary capturing position towards the capturing end position or another preliminary capturing position and the preliminary diaphragm position towards the diaphragm end position or another preliminary diaphragm position depending on the capturing position deviation and/or the diaphragm position deviation,
   wherein the following steps are performed for image position correction:

h) capturing the calibration image from the view of the capturing end position while the diaphragm is located in the diaphragm end position, i) determining calibration offset information that depends on any positional deviation between the calibration pattern and the calibration mark on the calibration image, j) determining at least one correction value based on the calibration offset information, wherein the correction value describes a parameter adjustment required to perform the image position correction, wherein the correction value is determinable based on the fact that the calibration image was captured from the view of the capturing end position and in this case the diaphragm was arranged in the diaphragm end position, and k) performing the image position correction by changing at least one calibration parameter relating to the head-up display by the correction value.

13. The method according to claim 12, wherein after step g) of the method, a calibration condition is checked, wherein the method is continued in step h) if the calibration condition is met and is restarted in step a) if it is not met, wherein the calibration condition is met if the detected capturing position deviation and the diaphragm position deviation are smaller than a respectively predetermined limit value.

14. The diaphragm according to claim 2, wherein the mirror is or can be arranged laterally on the disk.

15. The diaphragm according to claim 2, wherein the disk, at least in the regions of the first positioning mark, the second positioning mark, and the calibration mark, consists of a transparent plastic, in particular of an acrylic glass.

16. The diaphragm according to claim 3, wherein the disk, at least in the regions of the first positioning mark, the second positioning mark, and the calibration mark, consists of a transparent plastic, in particular of an acrylic glass.

17. The diaphragm according to claim 4, wherein the disk, at least in the regions of the first positioning mark, the second positioning mark, and the calibration mark, consists of a transparent plastic, in particular of an acrylic glass.

18. The diaphragm according to claim 2, wherein the first positioning mark and/or the second positioning mark and/or the calibration mark is or comprises at least one line and/or at least one cross and/or at least one, in particular square, rectangle and/or at least one circle.

19. The diaphragm according to claim 3, wherein the first positioning mark and/or the second positioning mark and/or the calibration mark is or comprises at least one line and/or at least one cross and/or at least one, in particular square, rectangle and/or at least one circle.

20. The diaphragm according to claim 4, wherein the first positioning mark and/or the second positioning mark and/or the calibration mark is or comprises at least one line and/or at least one cross and/or at least one, in particular square, rectangle and/or at least one circle.

* * * * *